US007780561B2

(12) United States Patent
Nosaka et al.

(10) Patent No.: US 7,780,561 B2
(45) Date of Patent: Aug. 24, 2010

(54) POWER TRANSMISSION BELT HAVING A MARK THEREON AND A METHOD OF PROVIDING A MARK ON A POWER TRANSMISSION BELT

(75) Inventors: Sokichi Nosaka, Hyogo (JP); Takashi Hamada, Kagawa (JP)

(73) Assignee: Mitsuboshi Belting, Ltd. (JP)

( * ) Notice: Subject to any disclaimer, the term of this patent is extended or adjusted under 35 U.S.C. 154(b) by 1564 days.

(21) Appl. No.: 09/772,137

(22) Filed: Jan. 29, 2001

(65) Prior Publication Data

US 2001/0044353 A1 Nov. 22, 2001

(30) Foreign Application Priority Data

Jan. 27, 2000 (JP) ............................ 2000-019200

(51) Int. Cl.
*F16G 1/00* (2006.01)
*F16G 9/00* (2006.01)
*F16G 5/20* (2006.01)
*B41M 1/32* (2006.01)

(52) U.S. Cl. ....................... 474/260; 474/237; 474/251; 474/264; 156/137

(58) Field of Classification Search .............. 219/121.6, 219/121.69, 121.8, 121.68, 121.78; 474/260, 474/263, 264, 270–271, 238, 265; 427/155, 427/221, 556, 226, 259, 272; 428/192, 167, 428/187, 155; 156/137, 139, 304.3, 309.6; 198/847

See application file for complete search history.

(56) References Cited

U.S. PATENT DOCUMENTS 4,578,329 A * 3/1986 Holsappel .................. 427/555
4,753,863 A * 6/1988 Spanjer ...................... 427/221
4,861,620 A * 8/1989 Azuma et al. ............... 427/556
4,997,994 A * 3/1991 Andrews et al. ....... 219/121.69
5,244,080 A * 9/1993 Bierbaum ................... 198/847
5,329,090 A * 7/1994 Woelki et al. .......... 219/121.68
5,523,125 A * 6/1996 Kennedy et al. ............ 427/155
5,714,024 A * 2/1998 Tomiyama et al. .......... 156/137
5,779,584 A * 7/1998 Noguchi ..................... 474/237
5,843,258 A * 12/1998 Murakami .................. 474/271
6,103,349 A 8/2000 Matsumoto

FOREIGN PATENT DOCUMENTS

DE 29610216 U1 * 9/1996
JP 10-252833 A * 9/1998
JP 10252833 A 9/1998

* cited by examiner

*Primary Examiner*—Marcus Charles
(74) *Attorney, Agent, or Firm*—Woods, Phillips, Katz, Clark & Mortimer

(57) ABSTRACT

A method of providing a mark on a power transmission belt having a body with a length and laterally spaced side surface. The method includes the step of providing a mark on at least one of the laterally spaced side surfaces. The invention is also directed to a power transmission belt having a length and laterally spaced side surfaces, with a mark on at least one of the laterally spaced side surfaces.

19 Claims, 3 Drawing Sheets

POWER TRANSMISSION BELT HAVING A MARK THEREON AND A METHOD OF PROVIDING A MARK ON A POWER TRANSMISSION BELT

BACKGROUND OF THE INVENTION

1. Field of the Invention

This invention relates to power transmission belts having a length and laterally spaced side surfaces, with a mark on one of the laterally spaced side surfaces. The invention is also directed to a method of providing the mark on the power transmission belt.

2. Background Art

It is conventional to provide a mark on the back side of a power transmission belt. The mark may convey a wide range of information, such as a company name, a trademark, a model number, date material, etc. In one conventional process, a transfer mark is formed consisting of unvulcanized colored rubber, or the like, which is applied to a base material that may be a transparent synthetic resin film. The film, with the transfer mark thereon, is then applied to a molding drum. The belt components are then sequentially built up upon the drum over the film with the transfer mark thereon. As one example, the components may be a rubberized canvas layer, a tension rubber layer, a load carrying cord, and a compression rubber layer. The components may form either a single belt or a larger width belt sleeve. The belt/belt sleeve is then fit with a jacket, after which vulcanization is carried out. At completion of vulcanization, the film is removed from the belt/belt sleeve, leaving the mark adhered to the rubberized canvas layer.

During the vulcanization process, the mark and the base material to which the mark is applied become pressed into the back side of the belt/belt sleeve. The back side of the belt/belt sleeve may become depressed in the region where the mark and base material are applied. As a result, the back side of the belt/belt sleeve may have one or more steps thereon so that the back side surface is not uniformly flat.

This condition becomes significant particularly with V-ribbed belts used for driving accessories on automobiles, and particularly those systems in which a V-ribbed belt is used to drive multiple shafts. In a typical arrangement, the belt is looped in a serpentine manner around various automobile engine components, with the back side of the belt engaged by a tensioner. An uneven surface on the back side of the belt might produce vibrations during operation. This vibration may lead to unwanted noise generation. Additionally, when this condition is present, the use of the back side to drive one or more components may cause noise generation in use.

Various alternative methods of applying a mark to a belt/belt sleeve are known. For example, in JP-B-7-96330, a method is disclosed in which a transfer mark assembly is used, consisting of a mark on a base material and a canvas including unvulcanized rubber which are placed in lapped relationship with the mark facing the canvas layer. After heating and pressurization, the base material is stripped off to transfer the mark to the canvas layer before the canvas layer is integrated into a belt.

In JP-A-8-152048, a mark is applied on a base material of non-woven fabric, which is applied on a covering canvas for a belt to integrate the mark into the covering canvas.

However, with the above described methods, the mark on the back side of the belt tends to be easily erased when the back side of the belt is used as a driving face in contact with a pulley. This erasure occurs as a result of repeated rubbing between the back side and a cooperating pulley. Accordingly, there is a tendency for the mark to become unreadable relatively soon after the belt is installed and operated. Thus, the information which is desirably legible for a significant portion of the belt life, such as the manufacturer's name, a trademark, month and year of manufacture, manufacturing lot number, etc. may be made illegible.

In JP-A-7-233992, a method is disclosed in which an ink jet printer is used for directly printing a mark on the back side of a belt without using any separate carrier/base material. According to this method, a mark is printed directly by injecting ink on the back side of the belt using an ink jet printer. According to this method, each of the belts is prepared by cutting the belt to a desired width from a belt sleeve. A number of the belts are arranged on a supporting table and secured thereto. The supporting table is then moved to a printing position at which the ink jet printer can be operated to apply the ink. The ink is injected from an ink head onto the belt to produce the desired mark.

Ink applied through an ink jet printer is also prone to being erased after rubbing occurs between the back side of the belt and a cooperating pulley system.

SUMMARY OF THE INVENTION

In one form, the invention is directed to a method of providing a mark on a power transmission belt having a body with a length and exposed laterally spaced side surfaces. The method includes the step of providing a mark on at least one of the laterally spaced side surfaces by forming the mark directly on the at least one laterally spaced side surface.

The mark may be inscribed on the at least one of the laterally spaced side surfaces.

The mark may be inscribed to a depth of 0.1 to 1 mm.

In one form, the mark is inscribed with a laser beam.

The laser beam may be controlled with an angle of reflection that is adjusted using at least one scanning mirror.

In one form, the laser beam forms a depression in the at least one of the laterally spaced side surfaces. The method may include the step of directing the material into the depression, which material contrasts with the at least one of the laterally spaced side surfaces.

The mark may be inscribed with a laser beam with the body maintained in a stationary position.

The power transmission belt may take a number of different forms. In one form, the power transmission belt is a double V-ribbed belt having laterally spaced ribs extending lengthwise of the body on the inside and outside thereof. The body has a cushion rubber layer and at least one load carrying member in the cushion rubber layer and extending lengthwise with respect to the body. The method may be practiced also with a) cog belts having teeth spaced lengthwise of the body, b) a V belt, and c) a flat belt having flat surfaces on the inside and outside of the body.

The invention is also directed to a power transmission belt having a body with a length and exposed laterally spaced side surfaces and a mark on at least one of the laterally spaced side surfaces directly on the at least laterally spaced side surface without a separate layer applied to the at least one laterally spaced side surface to support the mark.

The mark may be inscribed on the at least one of the laterally spaced side surfaces.

The mark may be inscribed to a depth of 0.1 to 1 mm.

The mark may be inscribed with a laser beam.

The power transmission belt may be a double V-ribbed belt, a cog belt with teeth spaced lengthwise of the body, or a belt having flat surfaces on the inside and outside of the body.

In one form, the laser beam forms a depression and a material is provided in the depression which contrasts with the at least one of the laterally spaced side surfaces.

In one form, the body has at least one rib made from a cross-linked ethylene-α-olefin elastomer.

DETAILED DESCRIPTION OF THE DRAWINGS

Figure 1:
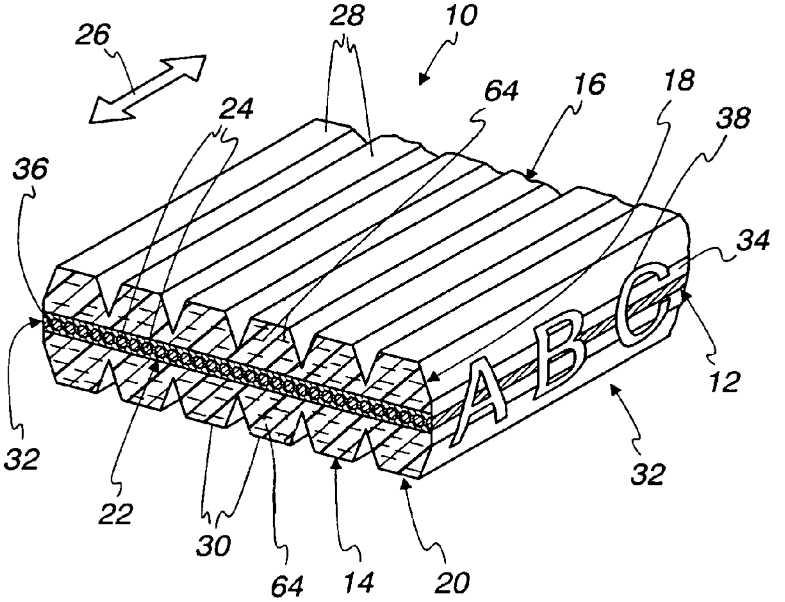
FIG. 1 is a fragmentary, perspective view of a double V-ribbed belt with a mark provided on a side surface thereof, according to the present invention.

In FIG. 1, one form of power transmission belt, with which the present invention can be practiced, is shown at 10. The power transmission belt 10 is a double, V-ribbed belt having a body 12 with an inside 14 and an outside 16. The body 12 consists of a tension rubber layer 18 and a compression rubber layer 20. A cushion rubber layer 22, between the tension rubber layer 18 and compression rubber layer 20, has load carrying cords 24 embedded therein and extending lengthwise of the belt, as indicated by the double-headed arrow 26. The load carrying cords 24 are preferably made to have high strength and low extensibility. The tension rubber layer 18 has a plurality of laterally spaced ribs 28 formed therein. The ribs 28 have a generally triangular shape in cross section and extend lengthwise of the belt body 12. The compression layer 20 has a similar arrangement of ribs 30. In this embodiment, the ribs 28,30 have an equal pitch and are laterally aligned with each other so as to be mirror images of each other relative to a plane bisecting the body 12 between the inside and outside thereof. However, the pitches of the ribs 28,30 could be different. Further, it is not necessary for the lateral positions of the ribs 28,30 to be matched.

According to the invention, a mark 32 is applied on one or both of oppositely facing, laterally spaced, side surfaces 34,36 of the body 12. As seen in FIG. 1, the mark 32 may be provided at the cushion rubber layer 22 on the load carrying cords therein and on the side surfaces, inside and outside of the cushion rubber layer 22, which engage cooperating pulleys. The mark 32 is formed directly on one or both of the side surfaces 34, 36 in a manner as described below, that directly alters the side surfaces 34, 36. The nature of the mark 32 is not limited and may convey virtually any type of information that is desirable to be placed upon a power transmission belt. As just examples, the information conveyed by the mark may be a company name, a trademark, the month and year of manufacture of the belt, a lot number, a grade, etc. For purposes of generic representation, the mark 32 in FIG. 1 is identified throughout as "ABC".

The mark 32 is applied by laser beam irradiation to a depth of 0.1 to 1 mm. This range is desirable in terms of providing a distinct mark without affecting the mechanical characteristics of the belt, such as its tensile strength. If the depth is less than 0.1 mm, contact between the belt and a cooperating pulley may ultimately result in early erasure of the mark 32. Irradiation to a depth of above 1 mm may result in an adverse thermal effect on the body 12, and more particularly the load carrying cords 24. Additionally, depressions 38, defined through the laser beam irradiation, may accumulate dust, which may ultimately be discharged during operation of the belt. This may cause contamination of the work area, within which the belt is operated, or surrounding equipment or materials.

The width of the characters in the mark 32 may vary significantly. A preferred range for the width of the lines, defining the characters in each mark, is 0.1 to 1 mm.

By treating the body 12 with a laser beam causing inscription to a depth of 0.1 to 1 mm, damage to the load carrying cords 24 occurs over only a part of the length of the body 12. That is because the load carrying cords 24 are spirally wrapped so as not to be exposed at the side surfaces 34,36 over the entire length of the belt body 12. That part of the load carrying cord 24 which is exposed and subjected to the laser beam inscription, contributes little to the lengthwise force transmission capabilities of the belt 10. Consequently, the damage that is done thereto through the marking process does not generally significantly adversely affect the performance of the power transmission belt 10.

Figure 2:
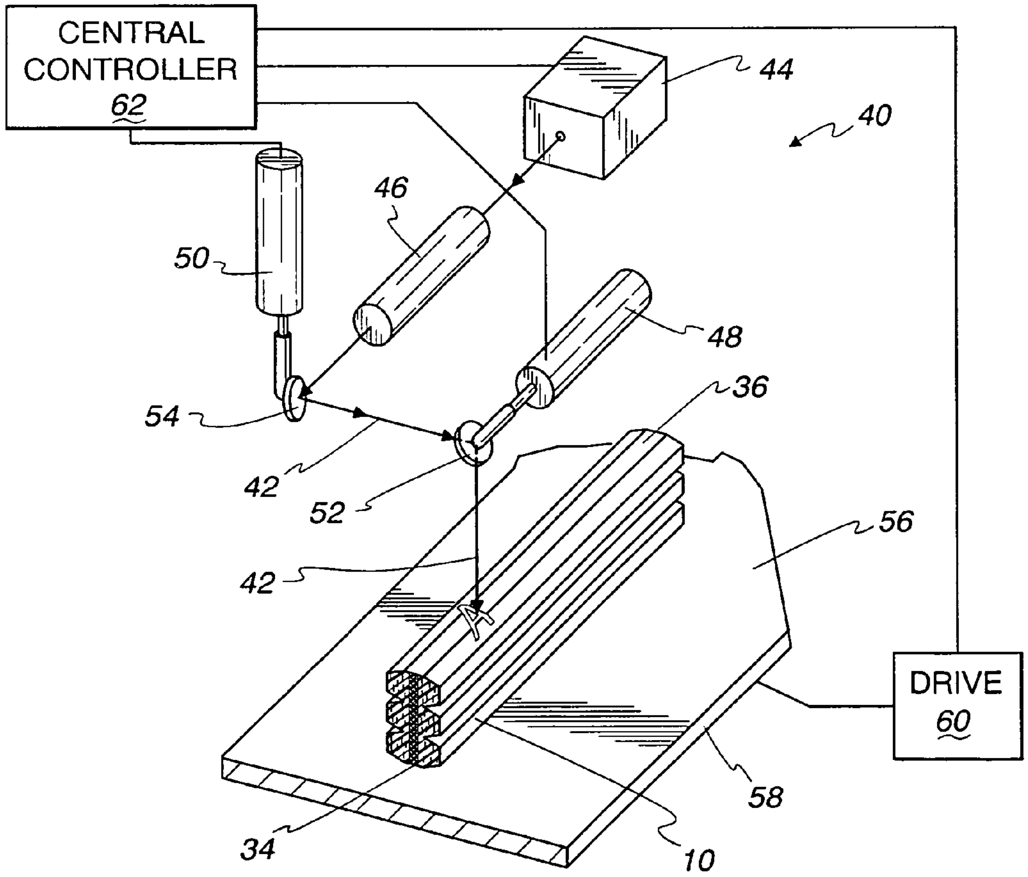
FIG. 2 is a perspective view of a system for applying the mark, as on the power transmission belt of FIG. 1, utilizing laser beam irradiation.
Figure 3:
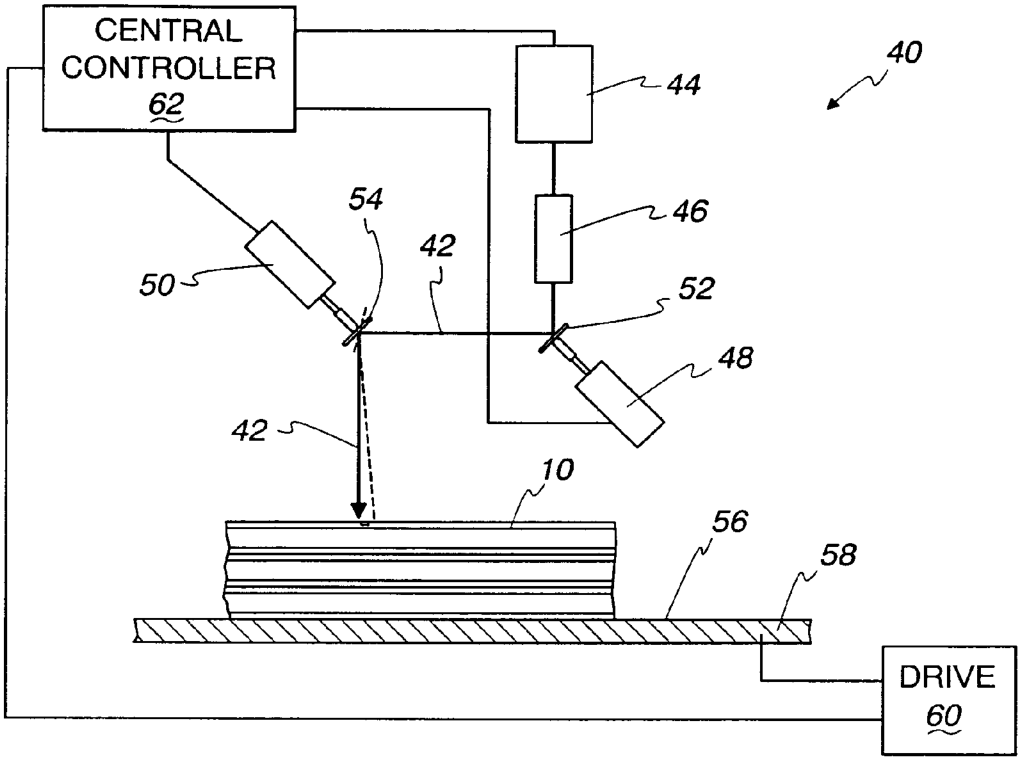
FIG. 3 is a side elevation view of the system in FIG. 2 with the mark being applied to a power transmission belt.

An exemplary laser beam irradiation system, used to practice the inventive method, is shown in FIGS. 2 and 3, at 40. In the system 40, a printing laser beam 42, such as a $CO_2$ laser beam generated from a laser oscillator 44, is concentrated at a condenser lens 46 to produce a focused laser spot. Separate control units 48,50 are used to control the position of scanning mirrors 52,54, to select the angle of reflection of the laser beam 42.

During the process, the power transmission belt 10 is fixed on a surface 56 of a support table 58, which is selectively movable through a drive 60. The power transmission belt 10 is supported by its one side surface 34 on the table surface 56 to expose the opposite surface 36 for marking. A central controller 62 can be used to coordinate operation of the control units 48,50, as well as the drive 60.

The marking process is similar to that of burning the surface 36. Irradiation with the laser beam 42 instantaneously melts only a small part of the rubber and fibers in the load carrying cords 24 and the rubber in the body 12 exposed at the surface 36 to effect vaporization thereof so as to form the depressions 38.

The movement of the scanning mirrors 52,54 can be carried out over a predetermined range to form part or all of the characters or the entire mark, depending upon the size and nature thereof, without having to shift the support table 58. Outside of this predetermined range, movement of the supporting table 58 is required to align the laser beam 42 at the desired location to make the necessary inscription. Once a particular mark, or component thereof, has been completed within the range permitted by movement of the scanning mirrors 52, 54, operation of the laser oscillator 44 can be interrupted through the central controller 62 to allow shifting of the belt, through the movement of the support table 58, to the next location at which the mark 32, or a part thereof, is to be formed. The movement can be coordinated to form the desired characters of each mark 32 and the desired number of marks 32 along the surfaces 34,36.

The scanning mirrors 52,54 can be operated automatically through a program in the central controller 62. The controller can also effect intermittent turning on and off of the laser beam 42 during the process. Through this arrangement, the laser beam 42 can inscribe the desired marks, which may be in the form of characters, signs, figures, numerals, etc.

The scanning mirrors 52,54 can be located a relatively short distance from the belt surface 36. Typically, this distance may be on the order of 100 to 150 mm. As a result, it is not necessary to carry out irradiation for a long period of time. As a consequence of this, the irradiation can be controlled so as not to significantly thermally damage any of the components of the belt, such as the load carrying cords 24, etc.

After the mark 32 is inscribed on the belt side surface 34,36 by irradiation with the laser beam 42, a colored material, such as ink, is applied in the depression(s) 38 using an ink jet and a color of ink that contrasts with the rest of the side surface 34,36. To apply the ink, the belt/belt sleeve used to form the power transmission belt 10 is trained around space pulleys and driven at a predetermined speed. The head of an inkjet printer (not shown) is moved together with the belt/belt sleeve. The ink is injected from the head to apply an ink layer in the depressions 38 at which the mark 32 is defined. Ideally, the amount of ink is such as not to overflow from the depressions 38.

The tension layer 18 and compression layer 20 may be made from one or more of ethylene-α-olefin elastomer, nitrile rubber, hydrogenated nitrile rubber, unsaturated carboxylic acid metallic salt added hyrdrogenated nitrile rubber, chlorosulfonated polyethylene, chloroprene, urethane rubber, epichlorohydrine rubber, natural rubber, CSM, ACSM, SBR, and the like. Of these materials, ethylene-α-olefin elastomer is preferred. Crosslinked ethylene-α-olefin elastomer generally affords good durability in both high and low temperature environments. The rubber preferably is a rubber including ethylene-propylene rubber (EPR) or ethylene-propylene-diene monomer (EPDM). Examples of a diene monomer are dicyclopentadiene, methylene norbornene, ethylidene norbornene, 1,4-hexadiene, cyclooctadiene, and the like.

In the tension and compression layers 18,20, peroxide may be added as a vulcanizing agent for ethylene-α-olefin elastomer. Co-agents, such as those normally used for peroxide crosslinking, including TIAC, TAC, 1,2-polybutadiene, unsaturated carboxylic acid metallic salt, oxime group, guanidine, trimethylolpropane trimethoacrylate, ethylene glycol dimethacrylate, N—N'-m-phenylenebismaleimide, sulfur, and the like, may be used.

N—N'-m-phenylenedimaleimide is preferred. N—N'-m-phenylenedimaleimide increases the degree of crosslinking to potentially reduce the wear resulting from sticking and the like. The amount of N—N'-m-phenylenedimaleimide is preferably in the range of 0.2 to 10 parts by weight to 100 parts by weight of ethylene-α-olefin elastomer. Use of less than 0.2 parts by weight potentially reduces crosslinking density to reduce the resistance to normal wear, normal sticking wear, and the like. The addition of more than 10 parts by weight reduces the stretchability of the vulcanized rubber so that flexing resistance may be unacceptably compromised.

Addition of 0.01 to 1 part by weight of sulfur to 100 parts by weight of the ethylene-α-olefin elastomer may limit lowering of stretchability of the vulcanized rubber. Addition of over 1 part by weight may not significantly improve the degree of crosslinking and may not appreciably improve resistance to normal wear and sticking wear of the vulcanized rubber.

The organic peroxide used is preferably at least one taken from those normally used in crosslinking rubber and resin, such as diacyl peroxide, peroxy ester, diallyl peroxide, di-t-butyl peroxide, t-butylcumyl peroxide, dicumyl peroxide, 2•5-dimethyl-2•5-di(t-butyl peroxy)-hexane-3,1•3-bis(t-butyl peroxyisopropyl)benzene, 1•1-di-butyl peroxy-3,3,5-trimethyl cyclohexane. One with a one minute thermal decomposition half life of 150 to 250° C. is preferable. Preferably an amount of 1 to 8 parts by weight, and more preferably 1.5 to 4 parts by weight, to 100 parts by weight of the ethylene-α-olefin elastomer is used.

Short fibers 64 may be provided in the tension and compression rubber layers 18,20. Preferably, the short fibers 64 are at least one of nylon 6, nylon 66, polyester, cotton, and aramid that tend to improve the side pressure resistance of the layers 18,20. The side surfaces 34,36, which contact cooperating pulleys, are preferably ground so that the short fibers 64 project from the side surfaces 34,36. This reduces the coefficient of friction between the side surfaces 34,36 and cooperating pulleys, to thereby potentially decrease noise generated as the belt is running. Of the above short fibers 64 described, bristly and strong aramid short fibers, which have good wear resistance, have been found to be highly effective.

Additionally, reinforcement agents such as carbon black, silica and the like, fillers such as clay, calcium carbonate and the like, softening agents, processing aids, aging inhibitors, and co-crosslinking agents such as TIAC may be added to the tension and compression rubber layers 18,20.

In the cushion rubber layer 22, ethylene-α-olefin elastomer composition, as previously described for use with the tension and compression rubber layers 18,20, is used. However, for better adhesion with polyester fiber, aramid fiber, glass fiber, and the like, that are part of the load carrying cords 24, ethylene-α-olefin elastomer composition vulcanized with sulfur containing no peroxide, chlorosulfonated polyethylene composition, or hydrogenated nitrile rubber composition, may also be used.

The load carrying cords 24 preferably are made from polyethylene terephthalate fiber, polyester fiber with ethylene-2,6-naphthalate as a principal unit, and polyamide fiber. An adhesion treatment may be carried out to improve adhesion with rubber. This adhesion treatment involves dipping the fiber in resorcin-formalin-latex (RFL solution), whereafter the fiber is heated to dry the additive to form a uniform adhesive layer on the surface of the fibers. However, the treatment is not so limited and may be, for example, a pretreatment carried out with epoxy or isocyanate compound before the treatment with the RFL solution.

Figure 4:
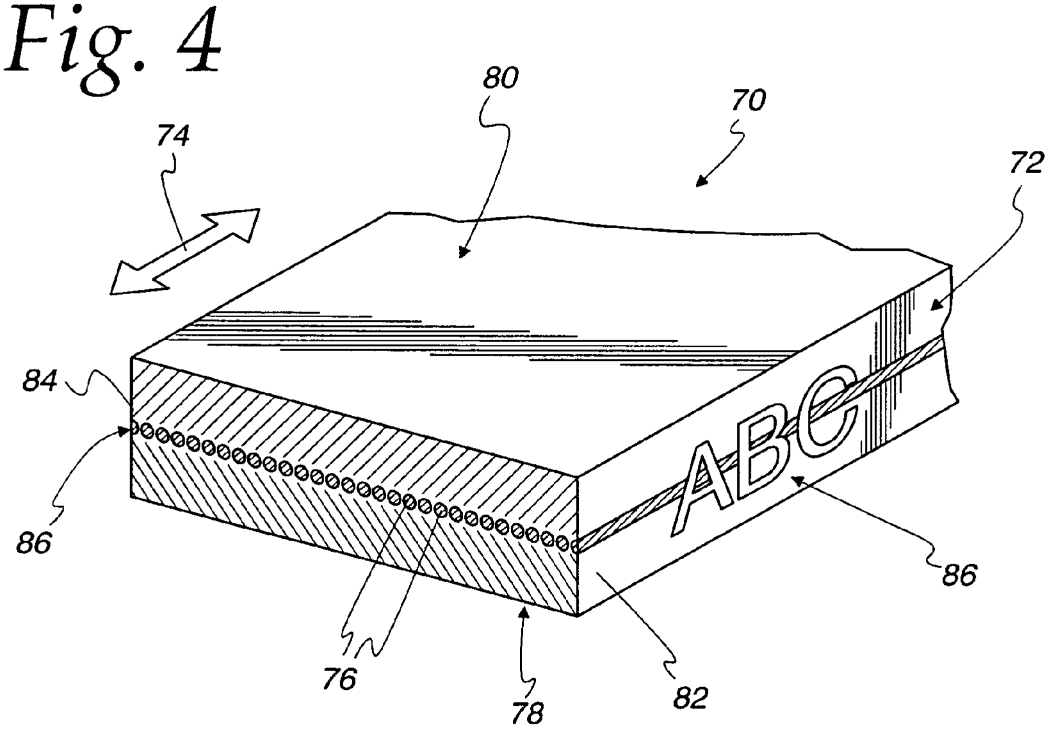
FIG. 4 is a fragmentary, perspective view of a flat belt with a mark applied thereto, according to the present invention.

In FIG. 4, another power transmission belt, which can be marked according to the present invention, is shown at 70. The belt 70 is a flat belt having a body 72 with a length in the direction of the double-headed arrow 74. The body 72 is made from rubber and has load carrying cords 76 embedded therein. The body 72 has an inside 78, an outside 80, and laterally spaced side surfaces 82,84 at which the load carrying cords 76 are exposed. A mark 86, having the nature of the mark 32, previously described, is provided on one or both of the side surfaces 82,84. The mark 86 is formed in the same manner as the mark 32, as described above.

Figure 5:
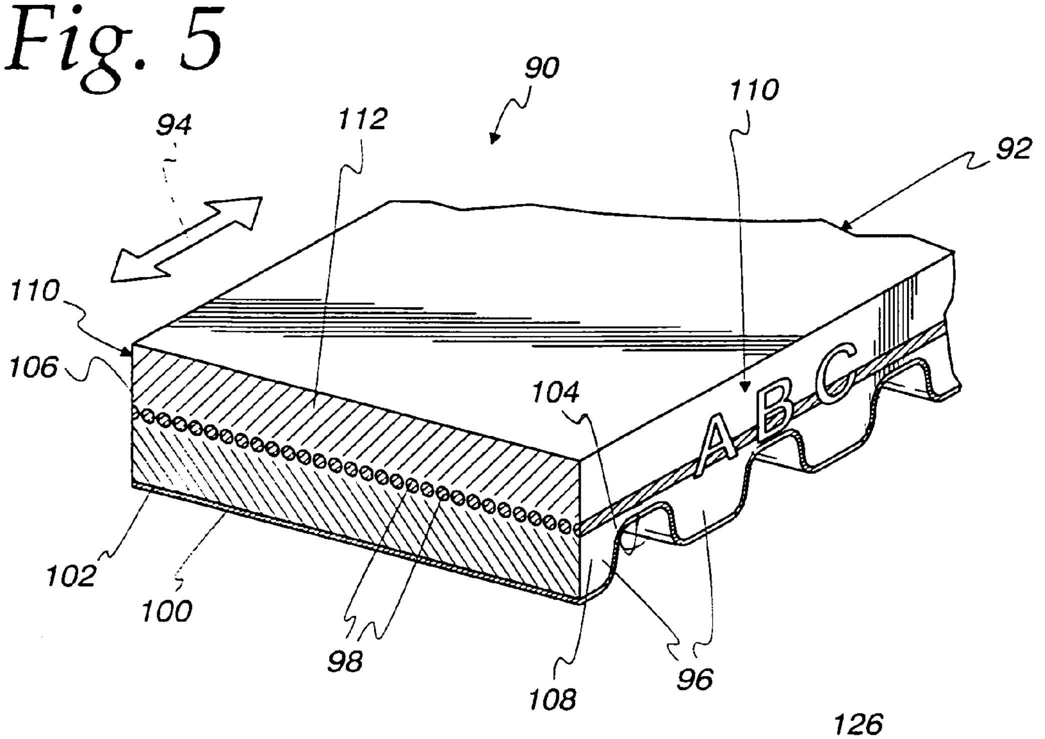
FIG. 5 is a fragmentary, perspective view of a cog belt with a mark applied thereto, according to the present invention.

In FIG. 5, another form of power transmission belt, which can be marked according to the present invention, is shown at 90. The power transmission belt 90 is a cog belt with a body 92 having a length in the direction of the double-headed arrow 94. The body has teeth 96 spaced at regular intervals along the length thereof. Load carrying cords 98 are embedded in rubber material defining the body 92. A cloth layer 100 is provided on the inside surface 102 of the teeth 96 and at a base surface 104 between adjacent teeth 96. The belt 90 has laterally spaced side surfaces 106,108 at which the load carrying cords 98 are exposed, and to which a mark 110, corresponding to the marks 32,86, previously described, is applied. The mark 110 has the same nature and is applied in the same manner as the marks 32,86, previously described.

The load carrying cords 98 may be made from twisted filaments of E glass or high strength glass with a diameter of 5 to 9 μm. The resulting cord is treated with a protective agent that may be one or more of a rubber compound, RFL solution as an adhesive, or the like. The twisted load carrying cords 98 may be made from organic fiber by twisting filaments of para-type aramid fiber (such as those sold commercially under the trademarks Kevlar™ and Technora™) of 0.5 to 2.5 denier that exhibit low elongation and high tensile strength. These filaments are treated with adhesive, which may be an RFL solution, epoxy solution, an isocyanate solution, and a rubber compound. However, the adhesive is not limited to these materials.

The diameter of the load carrying cords 98 is preferably within the range of 0.6 to 1.10 mm. Diameters less than 0.6 mm may not provide the required tensile strength to withstand high load transmission. Diameters over 1.10 mm may not practically fit within the dimensions of a belt.

The canvas cloth layer 100 can be made from one or more of 6 nylon, 66 nylon, polyester, and aramid fiber. The fibers may be used independently or mixed. A warp (in the direction of the width of the belt) and a weft (in the direction of the length of the belt) of the cloth layer 100 may be made with filaments or spun yarn using any of the above fibers. A weave fabric may be any of a plain weave fabric, twill weave fabric, and satin weave fabric. It is preferable to make the weft yarns at least partially from urethane elastic yarn having good stretching characteristics.

The rubber used for the teeth 96 and the belt back side 112 may be made from hydrogenated nitrile rubber, such as chlorosulfonated polyethylene (CSM), alkylated chlorosulfonated polyethylene (ACSM), chloroprene rubber, and the like. These and other compositions having good heat aging characteristics are desired. The hydrogenated nitrile rubber has hydrogenation rates preferably over 80%, with rates over 90% being preferable to provide good heat resistance and ozone resistance. Hydrogenated nitrile rubber with hydrogenation rates of less than 80% may not have adequate heat and ozone resistance.

To the above rubber, compounding additives such as carbon black, zinc oxide, stearic acid, plasticizers, and aging resistors, may be added. Vulcanizing agents, such as sulfur and organic peroxide, may be used. However, there is no limitation on the compounding additives or vulcanizing agents contemplated.

Figure 6:
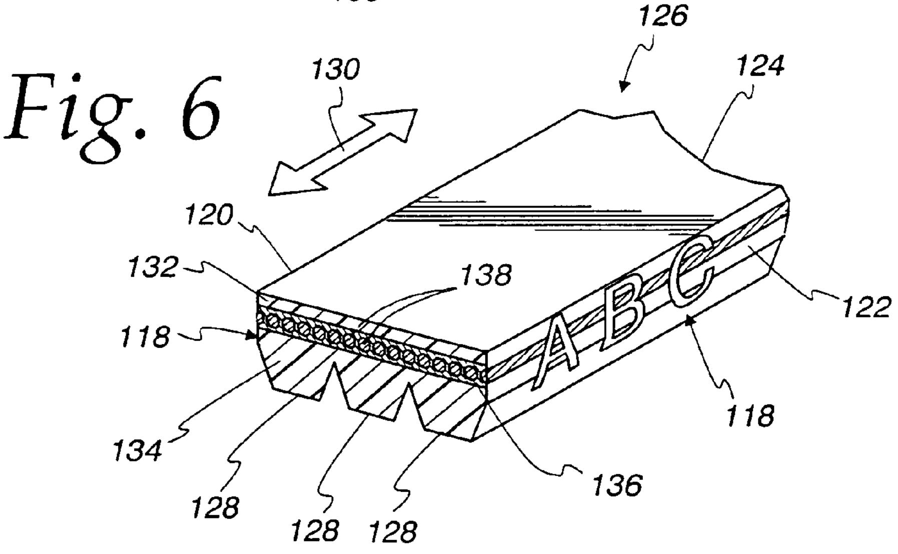
FIG. 6 is a fragmentary, perspective view of a V-ribbed belt with a mark applied thereto, according to the present invention.

The invention also contemplates marking other belt configurations. For example, as shown in FIG. 6, a mark 118 is applied on oppositely facing side surfaces 120,122 of the body 124 of a V-ribbed belt at 126. The V-ribbed belt 126 has laterally spaced, V-shaped ribs 128 extending lengthwise of the belt, as indicated by the double-headed arrow 130. The body 124 consists of a tension rubber layer 132, compression rubber layer 134, in which the ribs 128 are formed, and a cushion rubber layer 136, between the tension and compression rubber layers 132,134 and in which load carrying cords 138 are embedded. The mark 118 is applied in the same manner as the marks 32,86,110 previously described.

Figure 7:
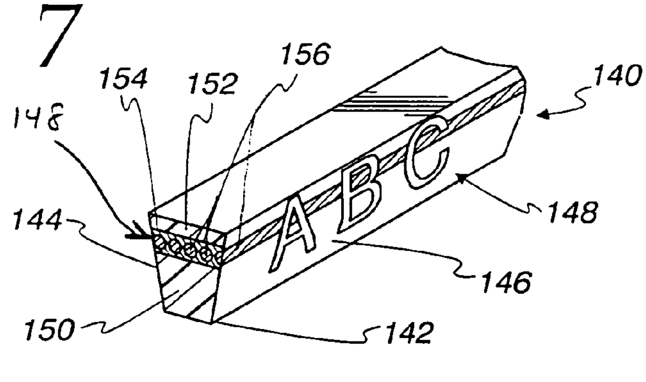
FIG. 7 is a fragmentary, perspective view of a V belt with a mark applied thereto, according to the present invention.

In FIG. 7, a V belt is shown at 140 having a body 142 with laterally spaced side surfaces 144,146 on which marks 148, according to the invention, are applied. The body 142 consists of a compression rubber layer 150, a tension rubber layer 152, and a cushion rubber layer 154, between the compression and tension rubber layers 150,152, and having load carrying cords 156 embedded therein.

The performance of belts, marked according to the present invention, will be explained with respect to the following example.

Example 1

A belt sleeve was made by using a tension rubber layer of 3 mm thickness, a cushion rubber layer of 0.5 mm thickness, and a compression rubber layer of 3 mm thickness. The compression rubber layer had the same composition as the tension rubber layer. The rubber in the compression and tension rubber layers was prepared from the composition shown in Table 1, below.

TABLE 1

| Composition No. | Inside and Outside Ribbed Sections | Adhesive Rubber Layer (Parts by Weight) |
|---|---|---|
| EPDM Mitsui 4045 | 100 | 100 |
| Nylon Cut Thread | 10 | — |
| Aramid Cut Thread | 10 | — |
| Stearic Acid | 1.5 | 0.5 |
| Zinc Oxide | 5 | 5 |
| HAF Carbon Black | 55 | 40 |
| Paraffin Oil | 15 | 15 |
| Water-containing Silica | — | 15 |
| Vulcanization Accelerator (1) | — | 1 |
| Vulcanization Accelerator (2) | — | 0.5 |
| Vulcanization Accelerator (3) | — | 1 |
| Sulfur | 8 | 1 |
| Peroxide (4) | — | — |
| Peroxide (5) | 2 | — |

(1) Tetramethylthiuram disulfaide (TMTD)
(2) Dipentamethylenethiuram tetrasulfide (DPTT)
(3) N-Cyclohexyl-2-benzothiazyl-sulfenamide (CBS)
(4) Dicumyl peroxide (40%)
(5) 1.3-bis-(t-butyl peroxy isopropyl) benzene (>98%)

The sleeve components were mixed using a Banbury mixer and thereafter rolled by a calendar roll to the desired thicknesses. A rope made from polyester fiber was used as a load carrying cord. In the tension rubber layer and the compression rubber layer, short, laterally extending fibers were provided.

The sleeve was trained around a driving rollers and an idler rollers and set at a desired tension. A diamond-coated grinding wheel was rotated at 1,800 rpm in a direction opposite to that of the direction of travel of the sleeve and contacted with the sleeve to form ribs and grooves therebetween.

The sleeve was then turned inside out and trained around driving and idler rollers, each having a cylindrical cartridge thereon for accepting the belt sleeve. The ribs and grooves were fitted to complementary ribs and grooves on the cartridges. The other side of the sleeve was ground to form ribs and grooves. The sleeve was then removed from the driving and idler rollers and trained around a separate set of cutting rollers and thereafter cut into V-ribbed belts which had three laterally spaced ribs.

The resulting double, V-ribbed belt was a K type, three-ribbed belt according to the RMA standard, with a rib pitch of 3.56 mm and a rib height of 2.0 mm for each of the inside and outside ribs. The belt thickness was 6.3 mm with a rib angle for each of the inside and outside ribs of 40°.

Using a system shown at 40 in FIG. 2, a $CO_2$ laser beam was generated lasing from a laser oscillator that was a 12 W, class 4, wavelength 10.6 μm type. The laser beam was concentrated through the condenser lenses. The scanning mirrors, coupled to control units, were scanned around two axes. The back side of the belt was irradiated with the belt supported upon the table, with the distance between the scanning mirrors adjusted to 130 mm. The desired mark was then inscribed on the belt side surface.

With a scanning speed of 50 mm per second, a printing time of 2.7 seconds, and laser power of 70%, characters of 4 mm in size and 0.5 mm in depth were inscribed on the belt side surfaces.

With the belt run at room temperature, the wear on the mark on the side surfaces was evaluated. In doing so, a dynamic testing system was utilized having a 120 mm diameter driving pulley, a 120 mm diameter idler pulley, and a 45 mm diameter tensioning pulley. The belt was run with the driving pulley rotated at 4,900 rpm and 85 kgf of initial tension loaded on the tension pulley. The mark was not erased after 1,000 hours of running. Further, no crack was generated at the marked location.

This testing verifies that a mark can be provided, according to the invention, which has a sharp, vivid appearance and which can be maintained in a legible state for a substantial period of running time. Surprisingly, this mark legibility is maintained without appreciably affecting the operating/performance characteristics of the belts by reason of altering the belt side surfaces. While the prior art has recognized the desirability of placing markings on the belt side surfaces, as seen, for example, in U.S. Pat. No. 6,103,349 (Matsumoto), this mark application has been carried out without any alteration of the side surfaces, presumably as a result of a conventional belief that such alteration would adversely affect the integrity of the belt. Matsumoto places the markings in an area that is not contacted by a cooperating pulley in operation. Matsumoto does not teach any surface alteration, as by inscription.

In short, the industry has predominantly used a back side marking technique, and has contended with marks that wear off after a relatively short running time. A solution to this problem, as offered by Matsumoto, is to surface treat a side of the belt without structural alteration, presumably as a result of a belief that such alteration could adversely affect belt performance. Matsumoto also teaches marking in a region that does not contact a pulley so that the mark will not be quickly worn off in use. The inventors herein have discovered that the sides can be altered in such a manner to provide a more durable mark without compromising belt performance, even in pulley contacting regions.

Variations from the embodiments shown are contemplated. For example, a layer of material could be provided on the belt side surface to support the mark which is formed with the layer of material in place on the belt side surface. This extra layer of material is generally not necessary, however, and is undesirable from the standpoint that it changes the width dimension of the belt to which it is applied.

The foregoing disclosure of specific embodiments is intended to be illustrative of the broad concepts comprehended by the invention.

The invention claimed is:

1. A method of providing a mark on a power transmission belt having a body with a length and exposed laterally spaced side surfaces, including portions to engage a cooperating pulley, said method comprising the step of:

forming a mark directly on the at least one laterally spaced side surface by inscribing the at least one laterally spaced side surface to a depth of 0.1 to 1 mm and so that at least a part of the mark is formed directly on at least one of the portions of at least one of the laterally spaced side surfaces.

2. The method of providing a mark on a power transmission belt according to claim 1 wherein the mark is inscribed with a laser beam.

3. The method of providing a mark on a power transmission belt according to claim 2 wherein the mark is inscribed with the laser beam with an angle of reflection that is adjusted using at least one scanning mirror.

4. The method of providing a mark on a power transmission belt according to claim 2 wherein the body comprises an inside and an outside, and the power transmission belt comprises a double V-ribbed belt comprising laterally spaced ribs extending lengthwise of the body on the inside and outside of the body, a cushion rubber layer, and at least one load carrying member in the cushion rubber layer and extending lengthwise with respect to the body.

5. The method of providing a mark on a power transmission belt according to claim 4 wherein the mark is inscribed with a laser beam with the body maintained in a stationary position.

6. The method of providing a mark on a power transmission belt according to claim 2 wherein the laser beam forms a depression in the at least one of the laterally spaced side surfaces and further comprising the step of directing a material into the depression, which material contrasts with the at least one of the laterally spaced side surfaces.

7. The method of providing a mark on a power transmission belt according to claim 2 wherein the mark is inscribed with a laser beam with the body maintained in a stationary position.

8. The method of providing a mark on a power transmission belt according to claim 2 wherein the power transmission belt comprises a V belt.

9. The method of providing a mark on a power transmission belt according to claim 8 wherein the laser beam forms a depression in the at least one of the laterally spaced side surfaces and further comprising the step of directing a material into the depression, which material contrasts with the at least one of the laterally spaced side surfaces.

10. The method of providing a mark on a power transmission belt according to claim 8 wherein the mark is inscribed with a laser beam with the body maintained in a stationary position.

11. The method of providing a mark on a power transmission belt according to claim 2 wherein the power transmission belt comprises a cog belt with teeth spaced lengthwise of the body.

12. The method of providing a mark on a power transmission belt according to claim 11 wherein the laser beam forms a depression in the at least one of the laterally spaced side surfaces and further comprising the step of directing a material into the depression, which material contrasts with the at least one of the laterally spaced side surfaces.

13. The method of providing a mark on a power transmission belt according to claim 11 wherein the mark is inscribed with a laser beam with the body maintained in a stationary position.

14. The method of providing a mark on a power transmission belt according to claim 2 wherein the body comprises an inside and an outside and there are flat surfaces on the inside and outside of the body.

15. The method of providing a mark on a power transmission belt according to claim 14 wherein the laser beam forms a depression in the at least one of the laterally spaced side surfaces and further comprising the step of directing a material into the depression, which material contrasts with the at least one of the laterally spaced side surfaces.

16. The method of providing a mark on a power transmission belt according to claim 14 wherein the mark is inscribed with a laser beam with the body maintained in a stationary position.

17. The method of providing a mark on a power transmission belt according to claim 1 wherein the inscribing forms a depression in the at least one of the laterally spaced side surfaces and further comprising the step of directing a material into the depression, which material contrasts with the at least one of the laterally spaced side surfaces.

18. A method of providing a mark on a power transmission belt having a body with a length and exposed laterally spaced side surfaces, each said side surface including a portion to engage a cooperating pulley, said method comprising the step of:

altering at least one of the laterally spaced side surfaces by forming an informational mark directly on the at least one laterally spaced side surface by an inscribing process to a depth of 0.1 to 1 mm at least partially on the portion of the at least one laterally spaced side surface.

19. The method of providing a mark on a power transmission belt according to claim 18 wherein the inscribing forms a depression and further comprising the step of directing a material into the depression, which material contrasts with the at least one of the laterally spaced side surfaces.

* * * * *